United States Patent [19]
Nicholas et al.

[11] Patent Number: 4,836,833
[45] Date of Patent: Jun. 6, 1989

[54] PRODUCTION AND RECOVERY OF HYDROGEN AND CARBON MONOXIDE

[75] Inventors: David M. Nicholas, New Tripoli; Stephen P. Goff, Kutztown; Thomas M. Roden, Macungie; Joseph P. Bushinsky, Allentown, all of Pa.

[73] Assignee: Air Products and Chemicals, Inc., Allentown, Pa.

[21] Appl. No.: 157,434

[22] Filed: Feb. 17, 1988

[51] Int. Cl.$^4$ .................... B01D 53/22; B01D 53/04
[52] U.S. Cl. .......................................... 55/16; 55/26; 55/58; 55/62; 55/68; 55/75
[58] Field of Search ................. 55/16, 25, 26, 68, 158, 55/58, 62, 74, 75; 423/359

[56] References Cited

U.S. PATENT DOCUMENTS

| | | | |
|---|---|---|---|
| 3,479,298 | 11/1969 | Sze et al. | 48/196 X |
| 3,564,816 | 2/1971 | Batta | 55/26 |
| 3,986,849 | 10/1976 | Fuderer et al. | 55/25 |
| 4,077,779 | 3/1978 | Sircar et al. | 55/25 |
| 4,171,206 | 10/1979 | Sircar | 55/26 |
| 4,172,885 | 10/1979 | Perry | 423/359 |
| 4,180,552 | 12/1979 | Graham et al. | 423/359 |
| 4,180,553 | 12/1979 | Null et al. | 423/359 |
| 4,229,188 | 10/1980 | Intille | 55/16 |
| 4,238,204 | 12/1980 | Perry | 55/16 |
| 4,264,338 | 4/1981 | Null | 55/16 |
| 4,479,925 | 10/1984 | Shires et al. | 423/359 |
| 4,529,411 | 7/1985 | Goddin, Jr. et al. | 55/16 |
| 4,548,618 | 10/1985 | Linde et al. | 55/16 |
| 4,548,619 | 10/1985 | Steacy | 55/16 |
| 4,639,257 | 1/1987 | Duckett et al. | 55/16 |
| 4,690,695 | 9/1987 | Doshi | 55/16 |
| 4,701,187 | 10/1987 | Choe et al. | 55/16 |
| 4,765,804 | 8/1988 | Lloyd-Williams et al. | 55/16 |

FOREIGN PATENT DOCUMENTS

| | | | |
|---|---|---|---|
| 156414 | 9/1984 | Japan | 55/16 |
| 230715 | 10/1986 | Japan | 55/16 |
| 153389 | 7/1987 | Japan | 55/16 |
| 153390 | 7/1987 | Japan | 55/16 |
| 273025 | 11/1987 | Japan | 55/16 |
| 2179366A | 3/1987 | United Kingdom . | |

Primary Examiner—Robert Spitzer
Attorney, Agent, or Firm—Geoffrey L. Chase; James C. Simmons; William F. Marsh

[57] ABSTRACT

Separation and individual recovery of high purity hydrogen and carbon monoxide from a mixed gas stream containing these compounds in association with carbon dioxide and one or more minor components such as particularly methane, is achieved by pressure swing adsorption to remove contained carbon dioxide from the charged gas, and further treatment of the $CO_2$-freed gas product by a sequence of steps utilizing (a) pressure swing adsorption and (b) selective permeation through a series of semi-permeable membranes, which steps (a) and (b) are carried out in either order of sequence.

16 Claims, 5 Drawing Sheets

ADS – ADSORB
RINSE 1 AT HIGH PRESSURE
DES – DESORB
RINSE 2 AT LOW PRESSURE
EVAC – EVACUATION

PRODUCTION AND RECOVERY OF HYDROGEN AND CARBON MONOXIDE

TECHNICAL FIELD

The present invention relates to processes for production of synthesis gas components and is particularly concerned with the separation and individual recovery of hydrogen and carbon monoxide from mixed gas streams at lower costs and at high purity and yield.

BACKGROUND OF THE INVENTION

The production of gas products rich in hydrogen by reforming of hydrocarbons is well established in industry. The obtained reformate, known as "synthesis gas", contains in addition to hydrogen, carbon dioxide and carbon monoxide; and includes varying amounts of one or more other components, such as methane, nitrogen and argon. Various methods have been devised for separation and recovery of hydrogen from the reformate and for the recovery of either or both carbon monoxide and carbon dioxide substantially free of accompanying contaminants.

The more conventional industrial processes for production of these hydrogen-rich gas products employ as starting material natural gas or other methane-rich hydrocarbon stream which is charged to a steam-methane reformer under conditions producing an effluent made up largely of hydrogen, carbon monoxide and carbon dioxide. In the conventional "state of the art" technology, the process gas is cooled to separate out water by condensation and $CO_2$ is removed by solvent extraction with monoethanolamine (MEA), carbonate solution or other $CO_2$ absorbent liquid. The $CO_2$-freed remainder is dried and compressed, then subjected to a cryogenic unit, so-called "cold box", wherein the gas is cooled to effect separation of hydrogen from $CO/CH_4$, and a high purity CO stream ($\sim$99.6% pure) is recovered. The hydrogen stream leaving the cold box (98% pure $H_2$) is further purified by pressure swing adsorption (PSA) from which there is obtained a substantially pure product ($\sim$99.9% $H_2$).

In certain known operations, reforming of a hydrocarbon stream for hydrogen production is carried out in a two-stage operation wherein primary steam reforming is followed by a secondary reforming with air or oxygen.

PRIOR ART

Two-stage reforming processes for production of hydrogen or synthesis gas are disclosed generally in U.S. Pat. No. 3,479,298 and in Published UK Patent Application No. 2179366A (4 March 1987). PSA systems for recovery and purification of hydrogen from steam reforming of hydrocarbons or other sources are well known in the art and are disclosed for example in U.S. Pat. Nos. 3,986,849; 4,077,779 and 4,171,206.

U.S. Pat. No. 4,479,925 discloses a complete process flow sequence for production of ammonia synthesis gas, starting with two-stage reforming to produce the crude synthesis gas followed in order by: conversion of CO in the reformate to $CO_2$ (shift conversion), removal of $CO_2$ by conventional absorption, methanation of trace carbon oxides and removal of excess nitrogen from the syngas before conversion to ammonia. From the ammonia synthesis recycle loop a purge stream is withdrawn and processed to recover hydrogen therefrom; which may be accomplished, according to the patent disclosure, by use of a semi-permeable membrane separation device or by a preferred cryogenic process.

Use of permeable membrane systems to recover hydrogen from an ammonia synthesis recycle loop is also disclosed in greater detail in U.S. Pat. Nos. 4,172,885; 4,180,552 and 4,180,553. A purge stream is withdrawn from the recycle loop and after $NH_3$ removal is contacted with a separation membrane to separate out hydrogen freed of methane and argon.

In U.S. Pat. No. 4,690,695 a feed gas stream is separated by the use of one or more permeable membranes for bulk separation and for residual product gas recovery, in combination with a pressure swing adsorption process for the recovery of high purity product gas, e.g., hydrogen from mixtures thereof with methane. Waste gas from the PSA system is passed to one or more of such permeable membranes for enhanced product recovery, the recovery levels achieved being advantageously reconciled with the corresponding compression and other cost factors pertaining to the overall process for the production of such high purity product gas.

SUMMARY OF THE INVENTION

In accordance with the present invention the recovery of components of synthesis gas from the reformate obtained in steam reforming of hydrocarbons, is accomplished at desired high product yields, and at significantly reduced capital and operation costs. In practice of the present invention by any of the several embodiments hereinafter described the reformate containing principally hydrogen, CO and $CO_2$ accompanied by minor amounts of other components, such as methane, is treated for removal of $CO_2$ therefrom by selective adsorption in an adsorbent bed operated in a pressure swing adsorption mode, followed by further purification of the $CO_2$-freed stream to recover a high purity hydrogen product (over 99% $H_2$) and a separate product stream rich in carbon monoxide. The further purification of the $CO_2$-freed stream is carried out by (a) selective adsorption of CO in a second adsorbent bed operated in pressure swing mode, preceded or followed by (b) passage of the gas stream through a series of semi-permeable membranes, thereby separately recovering a hydrogen product of at least 99 mol% purity and a carbon monoxide product stream comprised of at least about 85 mol% CO.

The operation of the invention will be understood and its advantages appreciated from the detailed description which follows read in connection with the accompanying drawings illustrating several alternative embodiments.

IN THE DRAWINGS

FIG. 1 is a schematic process flow diagram illustrating one embodiment for practice of the invention;

FIG. 2 is a schematic flow diagram of an alternative embodiment, illustrating a modified arrangement in operation of the multi-membrane system for recovery of carbon monoxide; and FIG. 3 is a schematic process flow diagram illustrating a preferred embodiment of the invention wherein the initial hydrocarbon feed is subjected to a steam reforming stage followed by secondary reforming in the presence of added oxygen.

DETAILED DESCRIPTION

Figure 1:
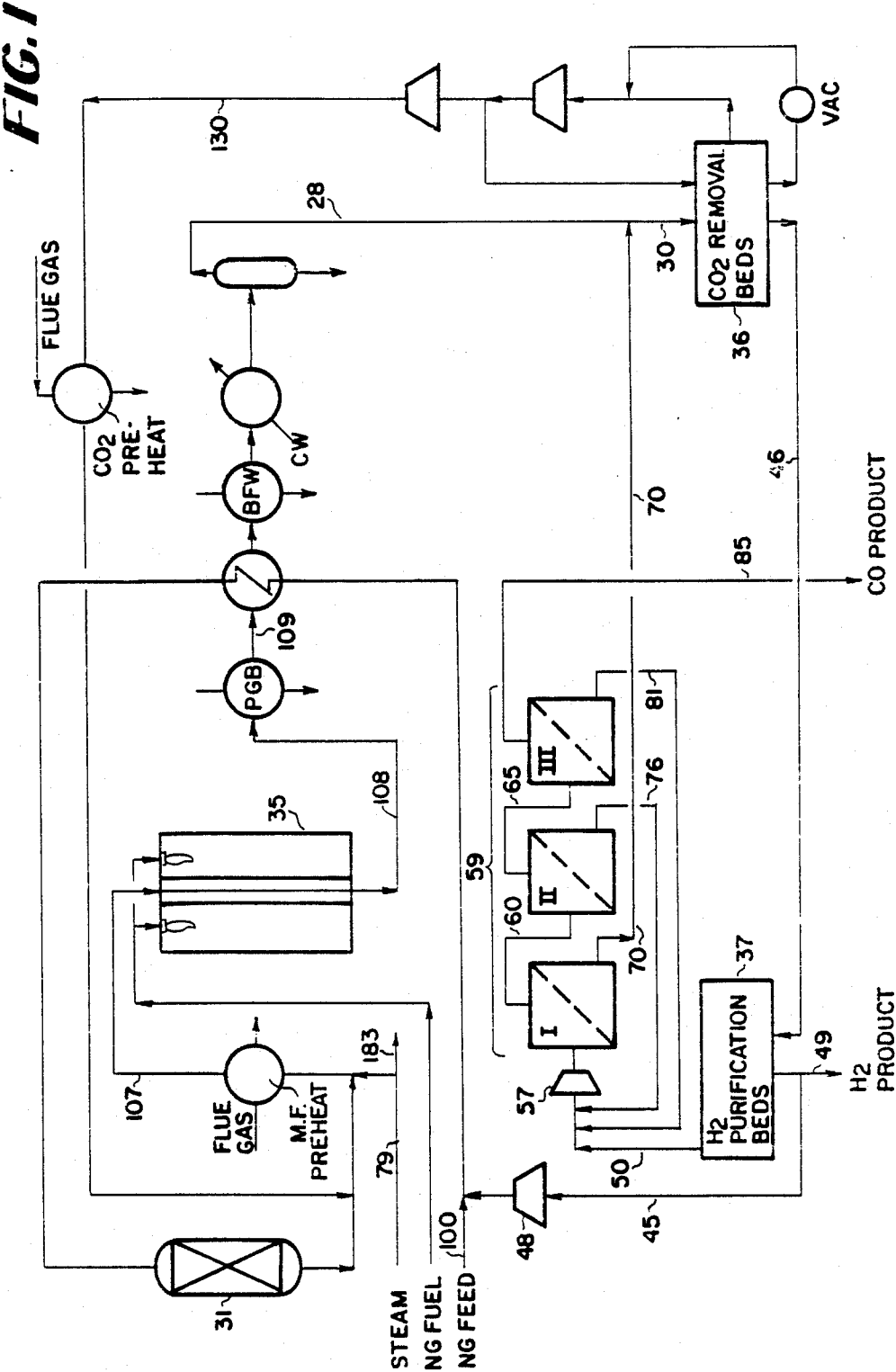

As shown in FIG. 1 a hydrocarbon feed composition rich in methane, such as natural gas (NG), is subjected to conventional steam reforming in a fuel-fired reforming furnace 35, after being first desulfurized at 31 and having steam added thereto via line 79. After several stages of cooling by exchange with conventional steam production, the reformate which is composed chiefly of hydrogen and oxides of carbon (CO and $CO_2$) together with a small quantity of methane (generally less than 5%) is transferred via line 28 to a multi-column PSA unit 36 for removal of contained $CO_2$, by passage at superatmospheric pressure through a bed of adsorbent therein selective in retention of carbon dioxide as opposed to hydrogen, carbon monoxide and methane.

The hydrogen-rich stream, freed of $CO_2$, is recovered as unsorbed primary effluent from PSA unit 36 and is transferred via line 46 to a multicolumn PSA unit 37 for further purification and recovery of an unsorbed hydrogen product of high purity (99+% $H_2$) discharged via line 49. A portion (45) of the pure hydrogen stream from line 49 is compressed at 48 and recycled for addition to the initial reformer feed (100) being subjected to desulfurization at 31.

The contaminant-laden adsorbent in the $H_2$ purification beds of the 37 unit is regenerated by removal of the sorbed contaminants (chiefly carbon monoxide and methane), which desorbed contaminants are discharged via line 50. After compression at 57, these discharged contaminants are sent to the multi-membrane system 59 for recovery of contained CO.

The invention is not limited to any particular PSA system for $CO_2$ removal from the steam reformate nor for further purification of the hydrogen-rich gas stream. In the preferred arrangement employed in practice of embodiments of the invention illustrated in FIGS. 1 and 3, the $CO_2$ removal beds of unit 36 and the $H_2$ purification beds of unit 37 are integrated sections of a single PSA system. A preferred arrangement of such integrated PSA system is illustrated in FIG. 4 of the accompanying drawings and is hereinafter described.

As illustrated in FIG. 1, part of the pure hydrogen product withdrawn from PSA unit 37 via line 45 is added to the initial natural gas or other hydrocarbon feed prior to desulfurization, thus providing hydrogen for hydrodesulfurization in 31.

In the embodiment illustrated in FIG. 1, the unadsorbed effluent 46 discharged from an adsorbent bed in PSA unit 36 will be composed chiefly of hydrogen, methane and carbon oxides, together comprising over 95% and generally 99% or more of the discharged gas composition. In regenerating the adsorbent in the $CO_2$ removal beds (unit 36), the known procedural sequence is employed as more fully described below. Table 1A shows the status of the $CO_2$ removal beds with respect to each other and with respect to the $H_2$ purification beds. The steps are as follows: (a) the contaminant-laden adsorbent is first rinsed at the prevailing superatmospheric pressure with essentially pure carbon dioxide, followed by (b) countercurrent gas withdrawal to an intermediate pressure level and then (c) to an about ambient pressure level; after which any remaining $CO_2$ and other sorbed contaminant is desorbed by (d) evacuating the adsorbent column to the lowest pressure in the cycle. The evacuated column is then restored to its initial on stream feed pressure level for repeating the sequence starting with the adsorption step, by introduction of the hydrogen-rich effluent stream from a companion column of the 36 unit then on the $CO_2$ adsorption step. The hydrogen-rich primary effluent leaving unit 36 via line 46 is subjected to treatment in PSA unit 37 to selectively remove substantially all but trace amounts of contaminants. The operation of the hydrogen purification unit 37 generally follows known schemes for adsorption and subsequent removal of sorbed contaminants. The gas stream passed to the adsorbent beds of unit 37 via line 46, generally will comprise 70–75% (vol/vol) hydrogen and up to 24 or more percent carbon monoxide; the remaining components, constituting up to about 2 to 3% of the gas composition, being made up of mostly methane with lesser amounts of $CO_2$ and nitrogen. At the termination of the adsorption step wherein the reformate from line 28 is passed through an on-stream adsorbent bed in PSA unit 36 and the primary effluent discharged via line 46 into and through a bed in unit 37, flow communication between these beds is discontinued and the separate regeneration of contaminant-laden adsorbent in the bed of unit 37 is initiated. Thus, the column containing the contaminant-laden bed of unit 37 is first reduced in pressure by gas withdrawal, the withdrawn gas being transferred to an adsorbent bed in a column of the 36 unit which had previously been evacuated; such gas withdrawal being continued until pressure equalization is attained between these columns. The unit 37 column is then brought to a near ambient pressure level by further countercurrent desorption. The effluent withdrawn via line 50 will comprise principally carbon monoxide together with hydrogen and a small amount of methane, and less than 1% of other contaminants ($N_2$, $CO_2$).

To recover the carbon monoxide as a high purity product, the gas stream in line 50 is compressed at 57 to a level of 300 to 1000 psia and introduced into multi-stage membrane system 59. In the embodiments illustrated in the several figures of the drawings the membrane system comprises 3 stages designated by blocks I, II, III. In passing through the first stage most of the hydrogen permeates through the membrane and is passed (in the FIG. 1 embodiment) via line 70 to mix with the reformate from line 28, to form the mixed gas composition of line 30 introduced into a PSA column of the $CO_2$ removal unit 36. The gas portion not permeating the first stage membrane (I) passes into the second stage (II) via line 60. The membrane-permeating gas leaving the second stage via line 76 is recycled to the inlet side of the compressor 57 where it is admixed with the line 50 composition. The portion that has not permeated the membrane in the second stage (II) passes via line 65 into the third stage of membrane separation (III). Whereas the initial mol ratio of $H_2/CO$ in the gas admixed to the membrane separation system 59 via line 50 is in the order of about 0.45, that leaving the second stage via line 65 is at about 0.15.

The portion permeating the third stage membrane (III) is discharged via line 81 and recycled to the inlet of compressor 57 to join the line 50 composition. This portion comprises about equal parts of hydrogen and CO constituting over 90% (generally about 93–94%) of the line 81 composition. The non-permeating portion of the gas leaving the third stage via line 85 constitutes the recovered CO product of about 90% CO purity; the contaminants being chiefly inerts such as methane and nitrogen.

The composition of selected key streams in the flow diagram of FIG. 1 is set out in Table 1.

TABLE 1

STREAM FLOW RATES AND COMPOSITIONS FOR SELECTED KEY STREAMS IN PROCESS 1

| Stream Number | 30 | 46 | 49 | 50 | 60 | 65 | 70 |
|---|---|---|---|---|---|---|---|
| Pressure, psia | 207.00 | 202.00 | 202.00 | 202.00 | 715.00 | 710.00 | 207.00 |
| Temperature, °F. | 99.82 | 105.00 | 105.00 | 105.00 | 100.86 | 101.59 | 100.86 |
| Flow Rates, mol/hr | | | | | | | |
| Methane | 37.06 | 37.06 | 0.00 | 37.06 | 39.43 | 38.27 | 5.08 |
| Hydrogen | 1,093.65 | 1,093.65 | 911.60 | 164.04 | 105.84 | 55.98 | 162.35 |
| Carbon Monoxide | 362.44 | 362.44 | 0.00 | 362.44 | 380.97 | 369.82 | 49.12 |
| Carbon Dioxide | 180.65 | 1.80 | 0.00 | 1.80 | 1.49 | 1.04 | 1.63 |
| Nitrogen | 1.40 | 1.40 | 0.00 | 1.40 | 1.46 | 1.42 | 0.15 |
| Water | 6.12 | 0.00 | 0.00 | 0.00 | 0.00 | 0.00 | 0.00 |
| Total Flow, mol/hr | 1,681.35 | 1,496.37 | 911.60 | 566.77 | 529.19 | 466.55 | 218.35 |
| Stream Number | 76 | 81 | 85 | 100 | 107 | 108 | 183 |
| Pressure, psia | 48.59 | 20.00 | 705.00 | 564.00 | 284.00 | 255.00 | 725.00 |
| Temperature, °F. | 100.70 | 100.00 | 100.67 | 100.00 | 1,021.66 | 1,625.00 | 506.97 |
| Flow Rates, mol/hr | | | | | | | |
| Methane | 1.22 | 6.23 | 32.39 | 310.04 | 310.04 | 31.95 | 0.00 |
| Ethane | 0.00 | 0.00 | 0.00 | 11.02 | 11.02 | 0.00 | 0.00 |
| Propane | 0.00 | 0.00 | 0.00 | 1.77 | 1.77 | 0.00 | 0.00 |
| Butane | 0.00 | 0.00 | 0.00 | 0.75 | 0.75 | 0.00 | 0.00 |
| Pentane | 0.00 | 0.00 | 0.00 | 0.29 | 0.29 | 0.00 | 0.00 |
| Hexane | 0.00 | 0.00 | 0.00 | 0.26 | 0.26 | 0.00 | 0.00 |
| Hydrogen | 49.88 | 54.27 | 1.74 | 0.00 | 17.99 | 931.37 | 0.00 |
| Carbon Monoxide | 11.09 | 56.55 | 312.95 | 0.00 | 0.00 | 313.39 | 0.00 |
| Carbon Dioxide | 0.44 | 0.87 | 0.14 | 2.78 | 181.51 | 179.64 | 0.00 |
| Nitrogen | 0.03 | 0.18 | 1.24 | 1.24 | 1.24 | 1.24 | 0.00 |
| Water | 0.00 | 0.00 | 0.00 | 0.00 | 988.97 | 679.31 | 1,794.42 |
| Total Flow, mol/hr | 62.66 | 118.11 | 348.47 | 328.19 | 1,513.88 | 2,136.93 | 1,794.42 |

In a preferred operation of the invention, as illustrated in FIG. 1, the starting natural gas feed (100) having a typical composition as listed in Table 1, is mixed with the hydrogen product slip stream (45) and preheated by exchange with reformed product (stream 109). The heated feed is passed through a sulfur removal bed in 31 and then injected with 725 psia saturated steam (from line 79) to produce a steam/carbon ratio of 2.88. The wet feed gas is combined with recycled $CO_2$ (from line 130) and preheated in the convection section of steammethane reformer 35 to provide stream 107 which enters the reformer catalyst tubes at a temperature of about 1022° F. and at a pressure of about 284 psia. Reformer flue gas is cooled to about 300° F. in the convection section (not shown) of the reformer. The recovered heat is used to preheat boiler feed water and $CO_2$, generate both process steam and export steam (lines 79 and 183), and preheat the natural gas/steam feed to the reformer.

The cooled process gas (line 28) is combined with recycle (from line 70) and the combined stream (30) sent to the PSA unit 36 where $CO_2$ is selectively adsorbed. Following the high pressure rinse employed in regeneration of the $CO_2$-laden bed of unit 36, desorption of contained $CO_2$ is effected by pressure let down and evacuation to provide the $CO_2$ by-product. The $CO_2$ is used chiefly to rinse the $CO_2$ removal beds and attain high recovery of the non-adsorbed species. In addition, the $CO_2$ recovered from the PSA cycle (essentially 100%) is recycled to the reformer feed.

The unadsorbed gas discharged from the bed in PSA unit 36 is passed via line 46 to PSA unit 37 for hydrogen purification, from which unit there is obtained the high purity (99.9%+) hydrogen (stream 49). Sorbed gas withdrawn from the adsorbent bed in unit 37 (stream 50) is compressed at 57 to 720 psia and fed to the 3-membrane system 59. The permeate stream 770) from membrane I, which contains 74% $H_2$ with CO and $CH_4$, is recycled to the $CO_2$ removal section (36) of the PSA unit while the residual stream (60) is passed to membrane II. Permeate from membrane II (stream 76) is recycled to the inlet of compressor 57. Residual from membrane II (stream 65) is fed to membrane III. The permeate from membrane III (stream 81) contains essentially equal amounts of $H_2$ and CO with a small amount of $CH_4$. Stream 81 is recycled to the inlet of feed compressors 57 while the residual (stream 85) is the obtained CO product.

A preferred integrated PSA system for use in practice of the embodiment of FIG. 1 is that shown and described in U.S. Pat. No. 4,171,206, pertinent details of which are herein incorporated by reference. The system, as illustrated in FIG. 4 of the accompanying drawings, comprises six parallel adsorption columns labeled 1A through 6A (conforming to PSA unit 36) and a second group of three adsorption columns labeled 1B, 2B and 3B (as PSA unit 37); with valve-controlled gas flow lines affording gas flow communication between selected columns of the two groups. The system further comprises gas flow manifolds F, G, H, J, K, at the feed end of the A group of columns, each of said columns being provided with a conduit L whereby such column under valve control can be placed in gas flow communication with a selected manifold. In similar manner, manifolds P, R, and N are provided at the opposite ends of the A group of columns with individual lines M connecting each of the A columns to a selected one of these manifolds through suitable valve operation.

Each of the B columns is connected at its feed end to manifold N through a line S, which line also is connected to manifolds W and T. The B columns are connected at their opposite ends to a manifold Z into which the primary recovered product (pure hydrogen) is discharged.

In operation of the PSA system of FIG. 4 (refer to Table 1A for the status of each bed), each of the A columns undergoes the following sequence of steps:

(1) Adsorption. The feed mixture (line 30, FIG. 1) flows at superatmospheric pressure from manifold F and line L into a selected A column (say 1A) which has previously been pressurized to designed adsorption pressure level, through the bed of adsorbent, discharging via line M into manifold N, and then passes into and through the adsorbent bed in a selected B column (say 1B) discharging purified product ($H_2$) into manifold Z. This step is continued until $CO_2$ breaks through the exit end of the A column or somewhat short of it. During this step $CO_2$ is selectively adsorbed in the A bed and most of the other remaining impurities are adsorbed in the B bed.

(2) High Pressure Rinse. At the termination of step (1) a stream of essentially pure $CO_2$ is passed at the existing feed pressure through the inlet end of column 1A thereby sweeping out void gas into manifold P, flow connection between columns 1A and 1B having been disconnected. The discharged rinse product passes from manifold P into feed manifold F through connecting conduit Q. This step is continued until all the void gas is purged from column 1A.

(3) Desorption (I). Column 1A is next depressurized to an intermediate level by gas withdrawal therefrom through line L into manifold H. The withdrawn gas ($CO_2$) is recompressed by compressor C discharging into manifold G from which it is recirculated into another A column then undergoing step 2.

(4) Desorption (II). Column 1A is further depressurized to near ambient level by gas withdrawal countercurrent to feed direction, discharging the desorbed $CO_2$ into manifold J.

(5) Evacuation. Column 1A is next evacuated to lowest pressure level in the cycle by gas withdrawal from an intermediate level of the column via line U (or at the feed inlet end) passing into the inlet end of vacuum pump V via manifold K and discharging the withdrawn $CO_2$ into $CO_2$ collecting manifold J for any desired use or disposition.

(6) Pressure Equalization. The evacuated 1A column is connected with a B column that has completed its adsorption step (say column 2B), whereby gas flows from line S of the B column by way of manifold W into manifold R thence into the exit end of column 1A via line M. Flow is continued until columns 1A and 2B are at about equal pressure.

(7) Pressurization. Column 1A is next brought to designed feed pressure level using part of the pure hydrogen from manifold Z. The pressurizing gas flows from manifold Z into column 1B and is discharged into the exit end of column 1A through line M. Column 1A is now ready for repetition of the recited cycle.

During the time that an A column goes through an entire operating cycle, a B column completes two of its assigned cycles, thus:

(a) Adsorption. As above indicated, during the time that column 1A is on the adsorption step (1) the $CO_2$-freed gas discharged from column 1A flows into column 1B wherein contained impurities are adsorbed and the unsorbed pure hydrogen is discharged into manifold Z.

While column 1A is undergoing the high pressure rinse step (2), column 1B is subjected to steps (b) and (c), thus:

(b) Pressure Equalization. Column 1B is connected to another A column (say 3A), which has previously been evacuated, until the two columns are at substantially equal pressure level. Void gas (plus any desorbed gas) thus passes from the B column into the A column countercurrent to step (1) above.

(c) Desorption. Column 1B is depressurized to near ambient level by gas withdrawal through line S to manifold T. The effluent comprises dilute impurities of the feed mixture.

While column 1A is undergoing step 3 of its cycle, column 1B undergoes steps (d) and (e), thus:

(d) Low Pressure Rinse. Column 1B is rinsed with part of the high purity hydrogen from manifold Z, passed into the exit end of the column. The rinse product is discharged into line S, discharging into manifold T. This gas along with that from step (c) forms the low pressure tailgas from the B columns (stream 50 in FIG. 1).

(e) Pressurization. Column 1B is brought back to the pressure level attained after step (b) by further introduction of pure hydrogen from manifold Z. It is then connected to one of the A columns (say 4A) which has undergone step (6) and flow of the hydrogen is continued from the B column into the A column countercurrent to feed direction until both columns are at feed pressure level. The 1B column is now ready to repeat its recited cycle by introduction of the $CO_2$-freed gas discharged from an A column (say 4A) which is then commencing its adsorption step.

In the described PSA operation, the preferred adsorbent for the A beds is molecular sieve 13X or activated carbon; for the B beds it is preferred to employ molecular sieve 5A.

Table 1A below tabulates the steps undergone by each of the A and B columns respectively during an arbitrary 24 minute cycle. Other time cycles, of course, may be employed.

TABLE 1A

| TIME (min) | Unit 36 Columns | | | | | | Unit 37 Columns | | |
| --- | --- | --- | --- | --- | --- | --- | --- | --- | --- |
| | 1 | 2 | 3 | 4 | 5 | 6 | 1 | 2 | 3 |
| 0–1 | A | PE | E | D2 | D1 | R | A | P | PE |
| 1–2 | A | PE | E | D2 | D1 | R | A | P | PE |
| 2–3 | A | | E | D2 | D1 | R | A | PR | D |
| 3–4 | A | PR | E | D2 | D1 | R | A | PR | D |
| 4–5 | R | A | PE | E | D2 | D1 | PE | A | P |
| 5–6 | R | A | PE | E | D2 | D1 | PE | A | P |
| 6–7 | R | A | | E | D2 | D1 | D | A | PR |
| 7–8 | R | A | PR | E | D2 | D1 | D | A | PR |
| 8–9 | D1 | R | A | PE | E | D2 | P | PE | A |
| 9–10 | D1 | R | A | PE | E | D2 | P | PE | A |
| 10–11 | D1 | R | A | | E | D2 | PR | D | A |
| 11–12 | D1 | R | A | PR | E | D2 | PR | D | A |
| 12–13 | D2 | D1 | R | A | PE | E | A | P | PE |
| 13–14 | D2 | D1 | R | A | PE | E | A | P | PE |
| 14–15 | D2 | D1 | R | A | | E | A | PR | D |
| 15–16 | D2 | D1 | R | A | PR | E | A | PR | D |
| 16–17 | E | D2 | D1 | R | A | PE | PE | A | P |
| 17–18 | E | D2 | D1 | R | A | PE | PE | A | P |
| 18–19 | E | D2 | D1 | R | A | | D | A | PR |
| 19–20 | E | D2 | D1 | R | A | PR | D | A | PR |
| 20–21 | PE | E | D2 | D1 | R | A | P | PE | A |
| 21–22 | PE | E | D2 | D1 | R | A | P | PE | A |
| 22–23 | | E | D2 | D1 | R | A | PR | D | A |

TABLE 1A-continued

| TIME | Unit 36 Columns | | | | | | Unit 37 Columns | | |
|---|---|---|---|---|---|---|---|---|---|
| (min) | 1 | 2 | 3 | 4 | 5 | 6 | 1 | 2 | 3 |
| 23-24 | PR | E | D2 | D1 | R | A | PR | D | A |

Figure 2:
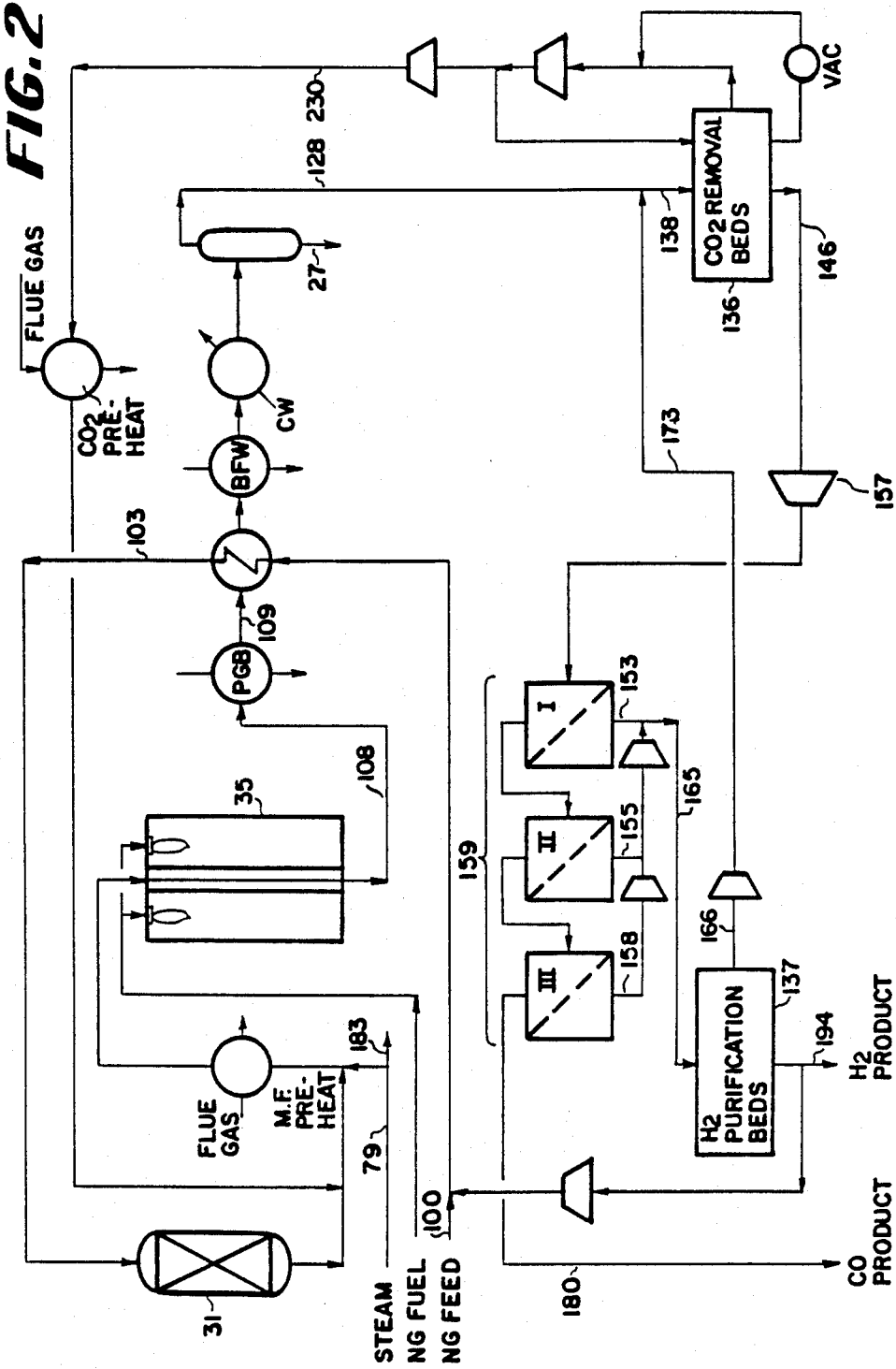

A = adsorption
R = high pressure rinse
D = desorption
D1 = desorption
D2 = desorption
E = evacuation
PE = pressure equalization
PR = pressurization In the embodiment of the invention illustrated in FIG. 2, the reformer and heat recovery operations are the same as those above described with respect to FIG. 1, the parts being similarly numbered. The cooled synthesis gas (line 128) is mixed with a recycle gas stream from the 137 unit of the PSA system and the combined streams are introduced into the 136 beds of the PSA system. In this instance the gas of stream 128 is mixed with the low pressure tail gas (stream 173) from the 137 beds of the PSA system. The $CO_2$ removal unit (136) is operated in a manner largely similar to that of U.S. Pat. No. 4,077,779 as hereinafter explained. Gas passing through the 136 unit of the PSA system at 202 psia (stream 146) is compressed at 157 to 720 psia and fed to the 3-membrane system (159). As will be seen from a comparison of Tables 1 and 2 there is a slight difference in the flow rate and composition between streams 46 and 146. Also, it will be noted, there is no significant difference between the composition of the CO product stream (85) recovered in the FIG. 1 embodiment as compared to that of the CO stream (180) recovered in the FIG. 2 embodiment.

The permeate streams from membranes II and III of the FIG. 2 embodiment (streams 155 and 158, respectively) are recompressed to 202 psia and mixed with the permeate stream (153) from membrane I. The combined streams are fed (as stream 165) to the PSA unit 137 for hydrogen purification. The obtained high pressure effluent (stream 194) is the obtained hydrogen product of almost 100% purity. Purge gas from the regeneration of the 137 PSA unit (line 166) is recompressed and recycled to the 136 unit via line 173. The compositions of selected key streams designated in FIG. 2 are set out in Table 2.

TABLE 2
STREAM FLOW RATES AND COMPOSITIONS FOR SELECTED KEY STREAMS IN PROCESS 2

| Stream Number | 146 | 155 | 158 | 180 | 194 |
|---|---|---|---|---|---|
| Pressure, psia | 202.00 | 43.02 | 20.00 | 705.00 | 202.00 |
| Temperature, °F. | 105.00 | 103.98 | 103.03 | 103.03 | 102.01 |
| Flow Rates mol/hr | | | | | |
| Methane | 46.01 | 1.74 | 5.67 | 31.99 | 0.00 |
| Hydrogen | 1,035.95 | 92.13 | 48.79 | 1.74 | 912.78 |
| Carbon Monoxide | 451.38 | 17.08 | 55.70 | 313.87 | 0.00 |
| Carbon Dioxide | 1.81 | 0.20 | 0.22 | 0.03 | 0.00 |
| Nitrogen | 1.67 | 0.05 | 0.17 | 1.24 | 0.00 |
| Water | 0.00 | 0.00 | 0.00 | 0.00 | 0.00 |
| Total Flow, mol/hr | 1,536.84 | 11.21 | 110.58 | 348.90 | 912.78 |

Figure 5:
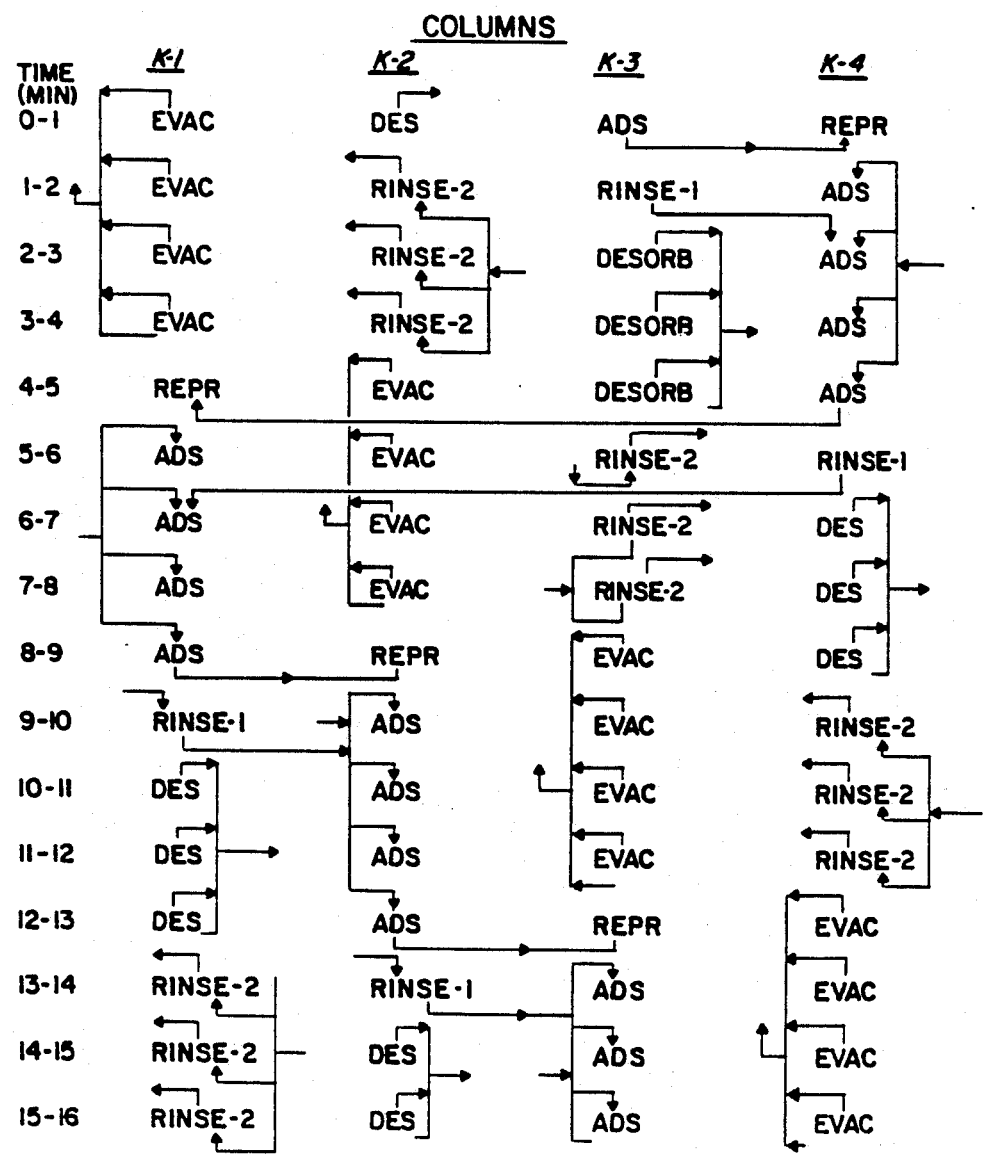
FIG. 5 is a preferred cycle and time program for adsorptive $CO_2$ removal in practice of the FIG. 2 embodiment.

The removal of $CO_2$ from gas mixture introduced by line 138 (combined streams 128 and 173) into PSA unit 136 may be performed in any of the known PSA systems designed for or effective in selective removal of $CO_2$ from a hydrogen-rich mixed gas. A preferred PSA unit that may be employed is disclosed, for example, in U.S. Pat. No. 4,077,779, using 4, 5 or 6 adsorption columns operated sequentially in parallel. A preferred embodiment of a PSA unit 136 employing four adsorption columns during a complete 16 minute cycle is portrayed in FIG. 5 of the present drawings, the arrowed lines depicting the flow of gas into and out of the designated columns. Thus, as shown in FIG. 5, each of the four adsorption columns designated K-1, K-2, K-3, K-4 undergoes in sequence the following operations during assigned time intervals as set out in FIG. 5: (1) repressurization, (2) adsorption, (3) high pressure rinse, (4) desorption, (5) low pressure rinse, and (6) evacuation. At the start of the operation the column to be put on stream (column K-4 of FIG. 5 for example) is pressurized with the unsorbed effluent from a companion column then on the adsorption step (2). With the column (K-4) having been brought to designed superatmospheric feed pressure level, 207 psia, the gas mixture (from line 138, FIG. 2) is introduced into the column, passing through the adsorbent bed therein in which contained $CO_2$ is adsorbed, and discharging an effluent having the composition listed in Table 2, stream 146.

Flow of the gas mixture into column K-4 is continued for the assigned time period up to or just short of breakthrough of $CO_2$ at the exit end of the column. The $CO_2$-laden bed of column K-4 is then rinsed of impurities contained in the void space at the existing high pressure and in the initial feed direction, using as (rinse) purge gas a stream of previously collected $CO_2$, thereby removing from the adsorbent bed and recovering void gas, in preferred practice all or part of the effluent gas (during the last minute of this step) is recycled to a companion column then on the adsorption step of the cycle (say column K-1).

Following the high pressure rinse step the adsorbent bed in column K-4 is desorbed by gas withdrawal (adsorbed $CO_2$) to ambient or an intermediate pressure level. Part of the effluent gas may be repressured and stored while the remainder is recycled (stream 230, FIG. 2) for addition to the desulfurized feed charged to the steam reformer 35.

Following the foregoing desorption step column K-4 is again rinsed, at the prevailing lower pressure, with an extraneous gas, preferably predried air or nitrogen admitted to flow through the column in a direction counter to that of initial feed. During this step most of the remaining sorbed components are swept out of the column.

Following the low pressure rinse column K-4 is evacuated to lowest pressure of the operating cycle.

Following the evacuation step, column K-4 is brought back to designed feed pressure level as indicated in step (1) above.

The preferred adsorbent for use in the beds of the 136 PSA unit is molecular sieve 13X or activated carbon. The off-gas (line 165, FIG. 2) from the membrane system 159 is charged to PSA unit 137 for further purification to recover the desired pure hydrogen (stream 194), the sorbed gas being desorbed from unit 137 and recycled via line 173 to join the gas mixture introduced into unit 136 via line 128.

The hydrogen purification in PSA unit 137 is preferably carried out in a PSA unit that operates similarly as those PSA's described in U.S. Pat. Nos. 3,986,849 and 3,564,816 hereby incorporated herein by reference. The cycle in U.S. Pat. No. 3,986,849 is an adiabatic pressure swing process for separation of gas mixtures by selectively adsorbing at least one gas component in each of multiple adsorbent beds by the cycle of introducing feed gas mixture to the bed inlet end at first highest superatmospheric pressure and discharging unadsorbed product effluent from the bed discharge end. Initial primary reformer duty is reduced by 30% compared to the other two embodiments described.

Figure 3:
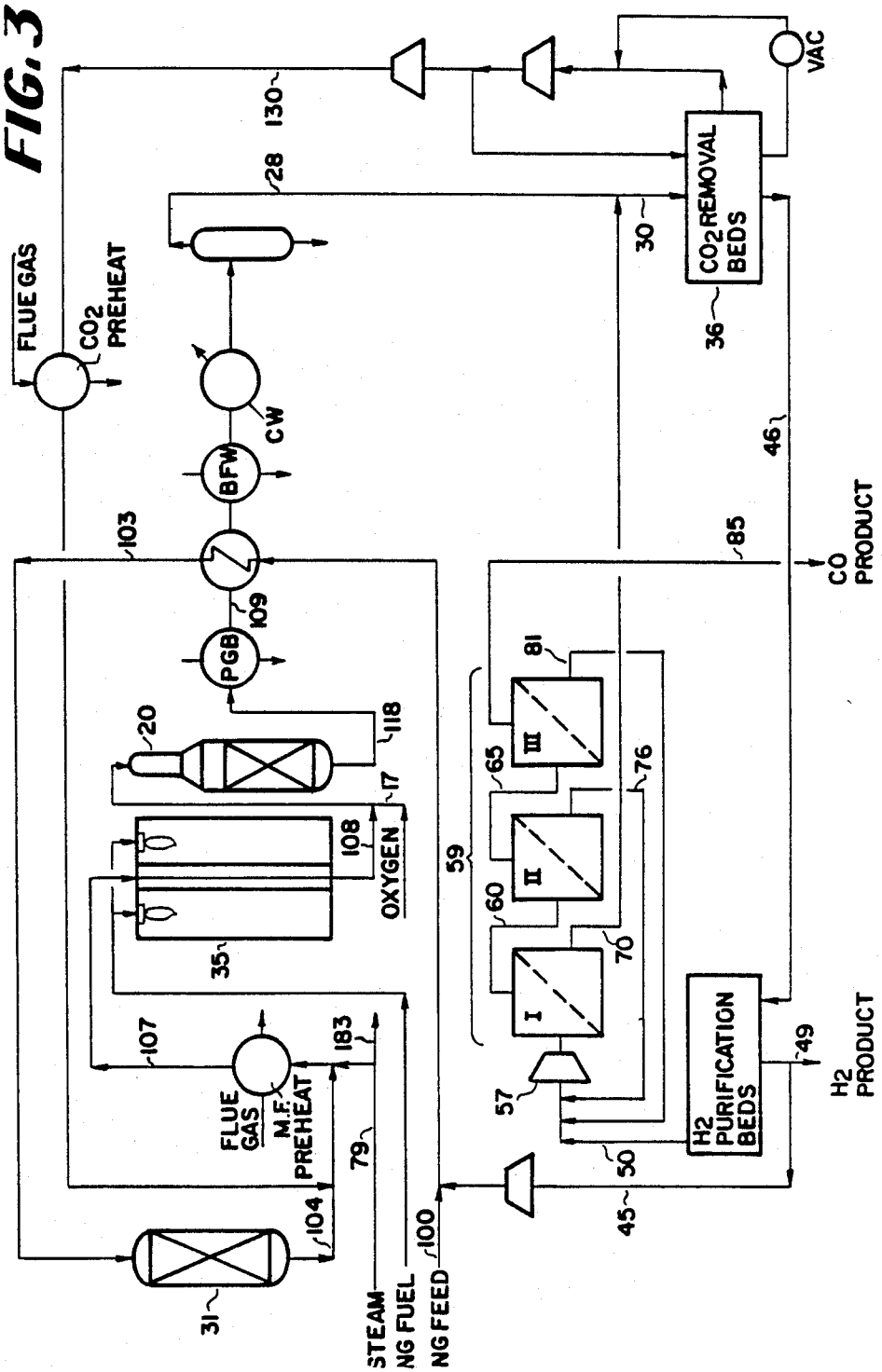
Figure 4:
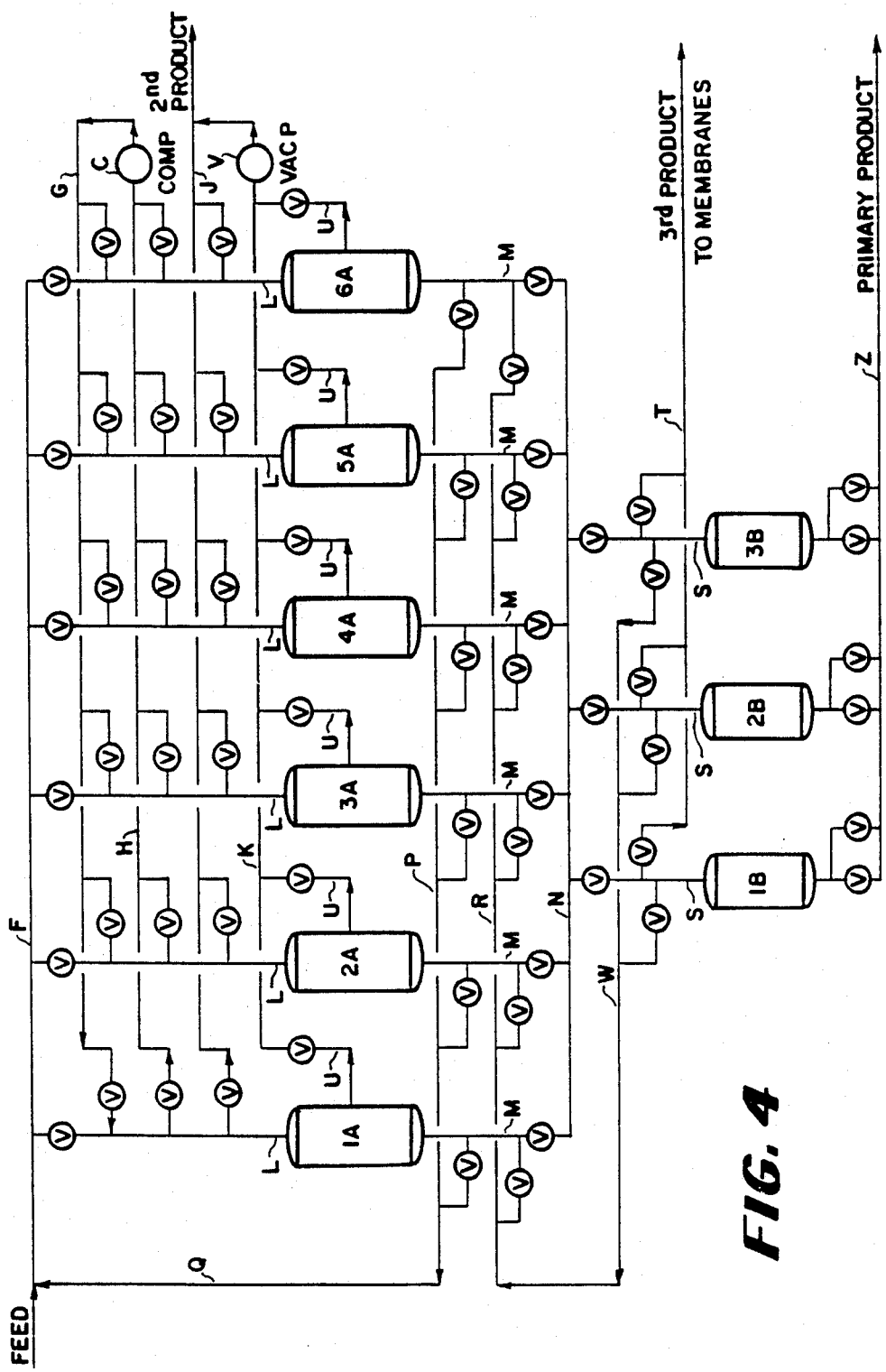
FIG. 4 is a flow diagram of a preferred integrated two stage PSA system for use in practice of the invention employing the embodiment of FIGS. 1 and 3.

The compositions of selected key streams involved in the FIG. 3 embodiment are tabulated in Table 3.

TABLE 3

STREAM FLOW RATES AND COMPOSITIONS FOR SELECTED KEY STREAMS IN PROCESS 3

| Stream Number | 17 | 30 | 46 | 49 | 50 | 60 | 65 | 70 | 76 | 81 | 108 | 118 |
|---|---|---|---|---|---|---|---|---|---|---|---|---|
| Pressure, psia | 264.00 | 207.0 | 202.0 | 202.0 | 202.0 | 715.0 | 710.0 | 207.0 | 48.6 | 20.0 | 264.0 | 244.0 |
| Temperature, °F. | 300.00 | 100.0 | 105.0 | 105.0 | 105.0 | 100.8 | 101.5 | 100.8 | 100.7 | 101.7 | 1500.00 | 1800.6 |
| Flow Rates, mol/hr | | | | | | | | | | | | |
| Methane | 0.00 | 3.44 | 3.44 | 0.00 | 3.44 | 3.67 | 3.56 | 0.46 | 0.11 | 0.57 | 75.72 | 2.98 |
| Hydrogen | 0.00 | 941.27 | 941.27 | 782.00 | 141.19 | 96.98 | 51.29 | 139.65 | 45.71 | 49.73 | 734.53 | 801.62 |
| Carbon Monoxide | 0.00 | 360.90 | 360.89 | 0.00 | 360.90 | 381.38 | 370.22 | 47.61 | 11.16 | 56.93 | 220.70 | 313.32 |
| Carbon Dioxide | 0.00 | 172.40 | 1.72 | 0.00 | 1.72 | 1.52 | 1.06 | 1.57 | 0.46 | 0.91 | 191.33 | 171.48 |
| Oxygen | 65.65 | 0.00 | 0.00 | 0.00 | 0.00 | 0.00 | 0.00 | 0.00 | 0.00 | 0.00 | 0.00 | 0.00 |
| Nitrogen | 0.00 | 1.27 | 1.28 | 0.00 | 1.28 | 1.34 | 1.31 | 0.14 | 0.03 | 0.17 | 1.14 | 1.14 |
| Water | 0.00 | 5.95 | 0.00 | 0.00 | 0.00 | 0.00 | 0.00 | 0.00 | 0.00 | 0.00 | 648.79 | 727.21 |
| Total Flow, mol/hr | 65.65 | 1,485.23 | 1,308.61 | 782.00 | 508.53 | 484.88 | 427.44 | 189.43 | 57.47 | 108.31 | 1,872.24 | 2,107.75 | void space gas is released from the bed discharge end and introduced to the discharge end of another adsorbent bed previously purged of the one component and initially at lowest pressure until the two beds are pressure equalized at higher intermediate pressure. Gas is released from the bed inlet end for countercurrent blowdown to lowest pressure. One component depleted gas from another adsorbent bed is introduced to the bed discharge end for desorption of the one component and purging through the bed inlet end. The purged bed is repressurized to the first highest superatmospheric pressure and the cycle is thereafter repeated. In U.S. Pat. No. 3,564,816 at least four beds of selective adsorbent material are provided, each with an inlet end and discharge end. This process may be generally classified as the partial adsorbate loading, cocurrent depressurization type wherein the feed gas mixture is introduced to the first bed inlet end at a first highest superatmospheric pressure for flow therethrough with selective adsorption of at least one component, and for discharge of unadsorbed product effluent from the discharge end. This flow is continued so that an adsorption front of the one component is established at the inlet end and moves progressively toward the discharge end as the adsorbate loading increases. Flow is terminated when the adsorption front is still entirely within the first bed-before breakthrough. This means that the bed is only partially loaded with adsorbate, and the section between the front and the discharge end is substantially free and clean of the adsorbate.

The flow diagram of FIG. 3 illustrates operation of an alternative embodiment wherein an oxygen secondary reforming step is employed following primary steam reforming in 35. By the operation according to this embodiment there is a purer CO product obtained due to the decreased $CH_4$ concentration. The primary reformer effluent (stream 108) exits at 1500° F. as compared to the 1625° F. exit temperature of the steam reformate in the embodiments of FIGS. 1 and 2. Both the primary reformer effluent 108 and a high pressure oxygen stream (17) are fed to the secondary reformer 20. The effluent from secondary reformer 20 exits at 1800° F. and has a $CH_4$ concentration 10% lower than that of the steam reformer effluent in the FIGS. 1 and 2 embodiments. In the present (FIG. 3) embodiment the primary reformer duty is reduced by 30% compared to the other two embodiments described.

In the embodiments of FIGS. 1 and 2 of the present invention the front ends (steam reforming sections) are largely similar to the "state of the art" technology above described.

The mixed feed preheat temperature (1022° F.) and the reformer effluent conditions (1625° F. and 255 psia) advocated for practice of the embodiments illustrated in FIGS. 1 and 2 are substantially the same as in conventional technology. A steam/carbon ratio of 2.86 and an outlet flue gas temperature of 338° F. were also maintained in the present operations for comparative purposes. Since there are no MEA reboilers used in the present invention technique, the heat recovery section was modified to enable recovery of the larger quantity of waste heat thus made available, and the heat recovery operation optimized for maximum steam generation.

The optimum pressure of the feed to the membrane systems in the described first two embodiments of the invention is at about 720 psia based on feed compressor horsepower and membrane area requirements. This optimum pressure, however, depends on power and membrane costs and membrane performance. In preferred practice the two PSA sections are operated at on-stream inlet pressures between about 207 and 202 psia and at temperatures of about 100° F.

In the operations according to each of the described embodiments of the present invention $CO_2$ product of 99+% purity and hydrogen of 99.9+% purity can be produced. Because of the high $CH_4$ concentration, the CO product obtained in each of the first two embodiments is only about 90%. By operation in accordance with the third described embodiment, employing secondary oxygen reforming, a CO product purity of 98% or more is attained. In each of the embodiments of the invention essentially 100% of the hydrogen and 98 or more percent of the CO is recovered without losses to recycle or fuel streams.

The installed costs for the novel processes of the present invention are significantly below that for the "state of the art" process. While the estimated costs for power and natural gas in operation of the embodiments of FIGS. 1 and 2 exceed those of the conventional process, there is nevertheless an overall cost advantage offered by the present invention taking into consideration the greater steam export, lower capital charge and higher product flow rates in the product purification systems. In each of the embodiments of the invention the CO product is recovered at 705 psia as compared to 65 psia recovery in the conventional process. This difference in pressure offers a further advantage applicable to a situation where high pressure CO is desired.

For the separation membranes employed in the system 59 for CO separation and recovery one may employ cellulose acetate and polysulfone.

What is claimed:

1. The method for individual recovery of hydrogen and carbon monoxide each at high purity, from a contaminated gas mixture containing these in association with carbon dioxide and methane, which comprises:

passing the gas mixture at superatmospheric pressure through a bed of solid adsorbent selective in adsorptive retention of carbon dioxide while discharging from said bed the unadsorbed primary effluent;

purifying said primary effluent by treatments, in either order of sequence, comprising: (a) pressure swing adsorption and (b) selective permeation through a system comprised of one or more semi-permeable membranes, thereby recovering hydrogen as a permeate stream separated from a non-permeate stream rich in carbon monoxide, said hydrogen stream having a purity of at least 99 mol% $H_2$ and said non-permeate stream comprising at least about 85 mol% CO.

2. The method as defined in claim 1 wherein said primary effluent is purified by being first subjected to pressure swing adsorption then to selective permeation.

3. The method as defined in claim 2 wherein said purification by pressure swing adsorption is carried out in an adsorbent bed comprised of molecular sieve.

4. The method as defined in claim 2 wherein the components of said primary effluent retained in an adsorbent bed during said purification by pressure swing adsorption are desorbed therefrom and the desorbed product stream is compressed to a pressure of at least about 6 atmospheres before passage of said product stream through said system of one or more semi-permeable membranes.

5. The method as defined in claim 4 wherein said system is composed of three semi-permeable membranes, and wherein the permeate from the first of said membranes is recycled to be combined with the gas mixture being passed through said bed of adsorbent selective in retention of carbon dioxide, and the permeates passing through the second and third membranes are returned to combine with said desorbed product stream being subjected to compression.

6. The method as defined in claim 5 wherein said contaminated gas mixture is one obtained by steam reforming of a methane-rich feed.

7. The method as defined in claim 5 wherein said contaminated gas mixture is one obtained by two-stage reforming of natural gas in a multistage operation comprising steam reforming followed by oxidative reforming in the presence of added free oxygen.

8. The method as defined in claim 1 wherein said primary effluent is purified by being first subjected to selective permeation and the obtained permeate further subjected to pressure swing adsorption for removal of contained contaminants and recovery of high purity hydrogen.

9. The method as defined in claim 8 wherein the removal of contained contaminants from the permeate by pressure swing adsorption is carried out by selective adsorption of these contaminants in an adsorbent bed comprised of molecular sieve.

10. The method as defined in claim 8 wherein said primary effluent freed of carbon dioxide is compressed to a pressure of at least about 6 atmospheres before being subject to selective permeation through a system comprised of one or more semi-permeable membranes.

11. The method as defined in claim 10 wherein said system is comprised of three semi-permeable membranes and wherein the permeate from the first of said membranes is subjected to further purification by pressure swing adsorption wherein accompanying contaminants are selectively adsorbed and an unadsorbed substantially pure hydrogen product stream is discharged.

12. The method as defined in claim 11 wherein said contaminated gas mixture is one obtained by steam reforming of a methane-rich feed.

13. The method as defined in claim 12 wherein a portion of said discharged hydrogen product stream is recycled and combined with said methane-rich feed subjected to steam reforming.

14. The method as defined in claim 11 wherein the contaminants selectively adsorbed during said further purification by pressure swing adsorption are desorbed and the desorbed contaminants are recycled to combine with said contaminated gas mixture being passed through said adsorbent selective in retention of carbon dioxide.

15. The method as defined in claim 11 wherein the respective permeate from the second and third membranes are compressed to about the pressure level of the permeate leaving the first membrane and are combined therewith, the combined permeates being subjected to further purification by pressure swing adsorption and recovery of substantially pure hydrogen.

16. The method as defined in claim 1 wherein said contaminated gas mixture is a product obtained by subjecting a methane-rich hydrocarbon stream to steam reforming followed by oxidative reforming of the obtained steam reformate in the presence of added oxygen.

* * * * *